United States Patent
Abe et al.

(10) Patent No.: US 8,362,761 B2
(45) Date of Patent: Jan. 29, 2013

(54) ROTATION ANGLE DETECTOR

(75) Inventors: Fumihiko Abe, Tokyo (JP); Kengo Tanaka, Tokyo (JP); Dongzhi Jin, Tokyo (JP)

(73) Assignee: Furukawa Electric Co., Ltd, Tokyo (JP)

( * ) Notice: Subject to any disclaimer, the term of this patent is extended or adjusted under 35 U.S.C. 154(b) by 693 days.

(21) Appl. No.: 12/447,183

(22) PCT Filed: Sep. 13, 2007

(86) PCT No.: PCT/JP2007/067783
§ 371 (c)(1),
(2), (4) Date: Jan. 6, 2010

(87) PCT Pub. No.: WO2008/050550
PCT Pub. Date: May 2, 2008

(65) Prior Publication Data
US 2010/0109655 A1    May 6, 2010

(30) Foreign Application Priority Data
Oct. 25, 2006    (JP) ................................. 2006-289881

(51) Int. Cl.
*G01B 7/30* (2006.01)
(52) U.S. Cl. .................................................. 324/207.25
(58) Field of Classification Search .............. 324/207.25
See application file for complete search history.

(56) References Cited

U.S. PATENT DOCUMENTS 6,163,148 A * 12/2000 Takada et al. ................. 324/226
2007/0090831 A1 * 4/2007 Matsumoto et al. ..... 324/207.25

FOREIGN PATENT DOCUMENTS

| JP | 59-217106 A | 12/1984 |
| JP | 2-272320 A | 11/1990 |
| JP | 6-289111 A | 10/1994 |
| JP | 9-121589 A | 5/1997 |
| JP | 11295022 | 10/1999 |
| JP | 2000-131005 A | 5/2000 |
| WO | 2005110058 A2 | 11/2005 |

OTHER PUBLICATIONS

International Search Report dated Oct. 23, 2007 for PCT Application Serial No. PCT/JP2007/067783, 2 Pages.
European search report dated Jan. 19, 2012 for EP Application No. 07807190.9-2213 / 2077438, 5 pages.

* cited by examiner

*Primary Examiner* — Bot Ledynh
(74) *Attorney, Agent, or Firm* — Turocy & Watson, LLP

(57) ABSTRACT

A rotation angle detector for detecting rotation angle of a rotator to be measured is provided. The detector includes a magnet which is fixed to the rotator to be measured and is rotated with the rotator to be measured and plural magnetic detection means respectively arranged at a prescribed angle, for detecting intensity of magnetic field generated by the magnet and outputting signals of electric charge based on the intensity of magnetic field. The detector further includes drive means for driving the plural magnetic detection means, where the drive means is capable of simultaneously changing magnetic sensitivities of the plural magnetic detection means in the same ratio. The detector further includes rotation angle calculation means for calculating rotation angle of the rotator to be measured based on signals output from the plural magnetic detection means.

15 Claims, 6 Drawing Sheets

ROTATION ANGLE DETECTOR

CROSS-REFERENCE TO RELATED APPLICATIONS

This application is a US national stage filing of patent cooperation treaty (PCT) Appln. No. PCT/JP2007/067783 (WO2008/050550), filed Sep. 13, 2007, which claims priority to Japanese patent application No. 2006-289881, filed on Oct. 25, 2006, the entire content of which are incorporated herein by reference.

TECHNICAL FIELD

This invention relates to a rotation angle detector for detecting rotation angle of a rotator to be measured. Especially, this invention relates to the rotation angle detector in which effect of disturbance factor such as change of temperature or the like, on output signals of plural magnetic detection means or the like, can be reduced.

BACKGROUND ART

Conventionally, as a rotation angle detector, the device is developed into which a magnet fixed to a rotator and magnetic detectors for detecting strength of the magnet are assembled, and, by rotating the rotator with the magnet relatively to the magnetic detection means, the rotation angle is detected, and which is utilized in various fields, for example, engine of vehicle, steering wheel, DC motor, or the like. Especially, the rotation angle detector in which hall elements are used as magnetic detection means, is developed and utilized.

And it is known that, in the magnetic detection means, magnetic strength to be detected is considerably varied by change of temperature or the like. Accordingly, in the rotation angle detector in which such magnetic detection means are utilized, the rotation angle to be detected has been affected by accident error caused by change of temperature or the like. Therefore, the rotation angle detector in which the rotation angle is detected without being affected by the change of temperature or the like, has been proposed.

In Patent document 1, there is proposed a rotation angle sensor including a drive circuit in which drive currents of hall elements are respectively controlled by applying similar constant currents as drive currents to the two hall elements, so that signal ratio of signals detected by each of hall elements is maintained constant.

FIG. 5 shows the drive circuit of the hall elements which are provided in a rotation angle sensor proposed in Patent document 1. As shown in FIG. 5, the hall voltages of the two hall elements 34a and 34b are respectively detected by drive detection circuits 50a and 50b. And the drive detection circuits 50a and 50b respectively comprise hall element drive part 51, hall voltage detection part 52 and detected voltage amplifying part 53.

Patent document 1: Japanese Patent Application Publication Hei11-295022

DISCLOSURE OF THE INVENTION

Problem to be Solved

However, in the Patent Document 1, since, as shown in FIG. 5, in the hall element drive part 51, the drive current values of the two hall elements 34a and 34b are determined by resistances R51a and R51b, there has been a problem that strictly equal current values can hardly be applied to the two hall elements 34a and 34b respectively because of the difference of initial resistance values caused by variation of parts of resistances 51a and 51b. Furthermore, there has been a problem that, since effect on the resistance R51a and R51b and Op-Amp Circuits (operational amplifier circuits) A51a and A51b caused by change of temperature are different from each other, the signal ratio of signals detected by the hall elements 34a and 34b can hardly be constant.

The present invention is made for solving these problems described above, whose purpose is to provide a rotation angle detector in which plural magnetic detection means such as hall elements are serially connected and, by applying the same drive current to each of the magnetic detection means, accident error of detection can be eliminated.

Means to Solve the Problem

To solve the conventional problems described above, the invention described below is provided.

A rotation angle detector according to the first embodiment of the present invention is the rotation angle detector for detecting the rotation angle of the rotator to be measured, comprising:

a magnet which is fixed to a rotator to be measured and is rotated with the rotator to be measured, plural magnetic detection means respectively arranged at a prescribed angle, for detecting intensity of magnetic field generated by the magnet and outputting signals of electric charge based on the intensity of magnetic field, drive means for driving the plural magnetic detection means, capable of simultaneously changing magnetic sensitivities of the plural magnetic detection means in the same ratio, and rotation angle calculation means for calculating rotation angle of the rotator to be measured based on the signals output from the plural magnetic detection means.

In use of this, the signals whose absolute values are equal can be output from magnetic detection means such as the plural hall elements included in the rotation angle detector. Accordingly, accident error of rotation angle detection caused by disturbance such as change of temperature, variation of electric source, or the like can be eliminated.

A rotation angle detector according to the second embodiment of the present invention is the rotation angle detector according to the first embodiment of the present invention, wherein, in the drive means, plural magnetic detection means are serially connected and the drive currents of all of the magnetic detection means are maintained equal constant values.

In use of this, the same drive currents can be applied to the magnetic detection means such as the plural hall elements included in the rotation angle detector. Accordingly, effect on the plural magnetic detection means caused by the disturbance such as change of temperature, variation of electric source, or the like can be the same, and absolute values of the signals output by the plural magnetic detection means can be equal. Namely, the accident error in detection of rotation angle caused by the disturbance such as change of temperature, variation of electric source, or the like can be eliminated.

A rotation angle detector according to the third embodiment of the present invention is the rotation angle detector according to the first or second embodiment of the present invention whose drive means comprises signal adjustment means for adjusting the signals output from the magnetic detection means into optimized signals within a prescribed range by changing the drive currents.

In use of this, the same arbitrary signal gain can be provided to the plural magnetic detection means included in the rotation angle detector from outside. Namely, by adjusting the signals output from the magnetic detection means into optimized signals, the accident error can be eliminated.

A rotation angle detector according to the fourth embodiment of the present invention is the rotation angle detector according to the third embodiment of the present invention whose signal adjustment means changes all of the drive currents of the plural magnetic detection means into equal current values by changing one reference voltage for preset reference resistance.

In use of this, since the reference voltage is changed, the signals output from the magnetic detection means can be adjusted into optimized signals.

A rotation angle detector according to the fifth embodiment of the present invention is the rotation angle detector according to the fourth embodiment of the present invention, whose reference voltage is generated by rectifying pulse width modulation signal.

In use of this, by converting pulse width modulation signal (PWM signal) as digital signal generated in use of microcomputer or the like, into analogue signal, desirable reference voltage can easily be generated.

For example, when a magnet made from NdFeB (neodymium, ferrous, boron) is used as the magnet; the magnet is demagnetized by around −0.1%/° C. accompanied by the change of temperature. And sensitivities of hall elements also are decreased by around −0.1%/° C. Accordingly, when they are used in the temperature ambience within the range of 120° C., between −40° C. and 80° C., they are respectively changed by around 12%, and the change of the signal intensities need to be expected by around 20%.

On the other hand, dynamic range needs to be optimized in signal processing. Namely, signal amplitude obtained as electric signal is constantly optimized. In the case that AD conversion (analogue signal to digital signal) is done by computer, resolution comes to a problem.

FIG. 6 shows one example of the output signal of the hall element when the magnet is rotated. The rotation angle of magnet θ is shown in horizontal axis and the output signal V of the hall element is shown in vertical axis. In the case of 10 bit AD conversion, since, when V in FIG. 6 is input to AD conversion in full range, it comes to the full range with amplitude of 90°, resolution of 90° C./1024=0.09° is obtained. However, in the case that the signal amplitude is increased or deceased by the change of temperature descried above, upper and lower parts of sinusoidal wave are lost (range over) when it is increased. And, when it is decreased, apparent full range is decreased, for example, when the signal amplitude is changed by 80%, amplitude of 90/1024/0.8=0.11° is obtained, and measurement accuracy is reduced.

Accordingly, it is preferable that signal gain is optimized correspondingly to the change of temperature under the operational environment of the rotation angle detector. Since the increase and decrease of the magnetic force and sensitivities of hall elements caused by the change of temperature are physically determined, the settings of sensitivities need to be set correspondingly to the temperature in use of temperature measurement means provided in the rotation angle detector.

A rotation angle detector according to the sixth embodiment of the present invention is the rotation angle detector according to any one from the first to fifth embodiment of the present invention, wherein the magnetic detection means consists of the hall elements and the drive means consists of the means to drive the hall elements with constant currents.

Effect of the Invention

According to the present invention, the same drive currents can be output to the magnetic detection means such as the plural hall elements included in the rotation angle detector. Accordingly, effects of disturbance such as change of temperature, variation of electric source, or the like on the plural magnetic detection means can the same, and the signal ratio of signals output from the plural magnetic detection means can be constant. Namely, the accident error in detection of rotation angle caused by the disturbance such as change of temperature, variation of electric source, or the like can be eliminated.

Furthermore, the same arbitrary signal gain can be provided to the plural magnetic detection means included in the rotation angle detector from outside. Namely, by adjusting signals output from the magnetic detection means into optimized signals, the accident error can be eliminated.

Figure 1:
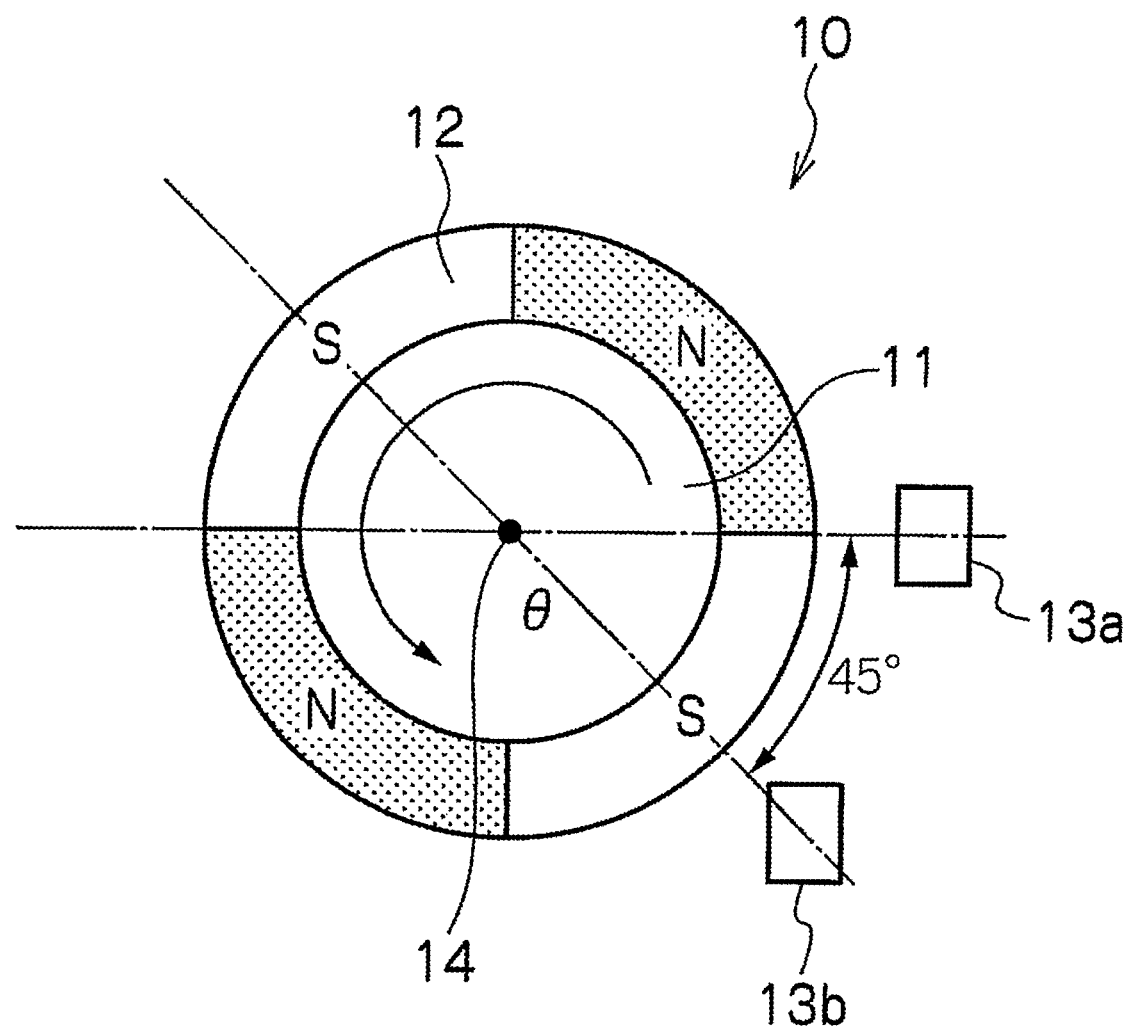
FIG. 1 shows one example of exterior configuration of the rotation angle detector to which the present invention is applicable.

| EXPLANATION OF THE REFERENCE NUMERALS | |
|---|---|
| 10, 30 | rotation sensor |
| 11, 31 | rotator |
| 12 | ring magnet |
| 13a, 13b, 33a, 33b | hall element |
| 14, 34 | rotation center axis |
| 20, 40 | drive circuit |
| 21 | hall element drive part |
| 22 | reference voltage adjustment part |
| 23 | operational amplifier |
| 24 | reference resistance |
| 25 | MCU (Micro Control Unit) |
| 26 | LPF (low pass filter) |
| 32 | disk magnet |
| 50 | rotation angle calculation part |

DESCRIPTION OF THE PREFERRED EMBODIMENTS

One embodiment of the present invention is explained referring to the figures. However, the explanations described below are only for explanation, and range of the present invention is not limited to them. Accordingly, although it is possible for person having ordinary skill in the art to apply embodiments in which each or all of the components are substituted for the equivalents, these embodiments are included in the range of the present invention.

FIG. 1 shows one example of exterior configuration of the rotation angle detector to which the present invention can be applied. In the description below, the rotation angle detector is called as a rotation sensor.

As shown in FIG. 1, the rotation sensor 10 comprises a ring magnet 12, hall element 13a, hall element 13b, drive circuit 20 (not depicted in the figure) and rotation angle calculation part 50 (not depicted in the figure), for detecting the rotation angle of the rotator 11. The ring magnet 12 is magnetized in the circle direction with two pairs of North Pole and South Pole alternately formed with each other. And the ring magnet 12 is fixed to the rotator 11 and is rotated with the rotator 11. In this sensor, a shaft which is vertical to the magnetic sensitive surface of the ring magnet 12 is fixed in the center of the ring magnet 12 in the diameter direction, as a rotation center axis 14. Although the ring magnet 12 is magnetized in the circle direction in this case, the ring magnet 12 can be magnetized also in the parallel direction to the rotation center axis (Z axis direction).

The hall elements 13a and 13b are arranged so that the change of intensity of magnetism in the vertical direction to the diameter direction of the ring magnet 12 can be detected. In this sensor, the hall elements 13a and 13b are arranged outside of the circle of the ring magnet 12 so that normal to the rotation center axis 14 on the magnetic sensitive surface substantially is declined by an angle of 45°.

In this case, the hall voltage V generated to the hall elements arranged in the magnetic field is expressed by the equation (1) described below, with the hall sensitivity which is determined by hall coefficient, shape of the hall elements, or the like denoted by $\alpha$, with magnetic flux density in the magnetic field generated by the magnet or the like denoted by B, and with drive current of the hall elements denoted by I.

$$V = \alpha \times B \times I \quad (1)$$

Namely, in the case that the hall sensitivity $\alpha$ is constant, the hall voltage V is proportionate to the magnetic flux density B and the drive current I. Since the hall voltage V is proportionate to the drive current I even though the magnetic flux density B is constant, this relation is called as sensitive magnetic properties (gain).

And change of the magnetic flux density B of the ring magnet 12 in the circle direction on the surface parallel to the magnetic sensitive surface of the ring magnet 12 is expressed by the equation (2) described below. In this case, Bo is constant number and fixed value because of the ring magnet 12.

$$B = B_0 \times \sin\theta \quad (2)$$

Accordingly, in the case that the drive current I of the hall elements is constant, it is found out that the hall voltage V of the hall elements 13a and 13b is proportionate to the magnetic flux density B.

Then, the outputs of the hall elements 13a and 13b are explained.

Figure 2:
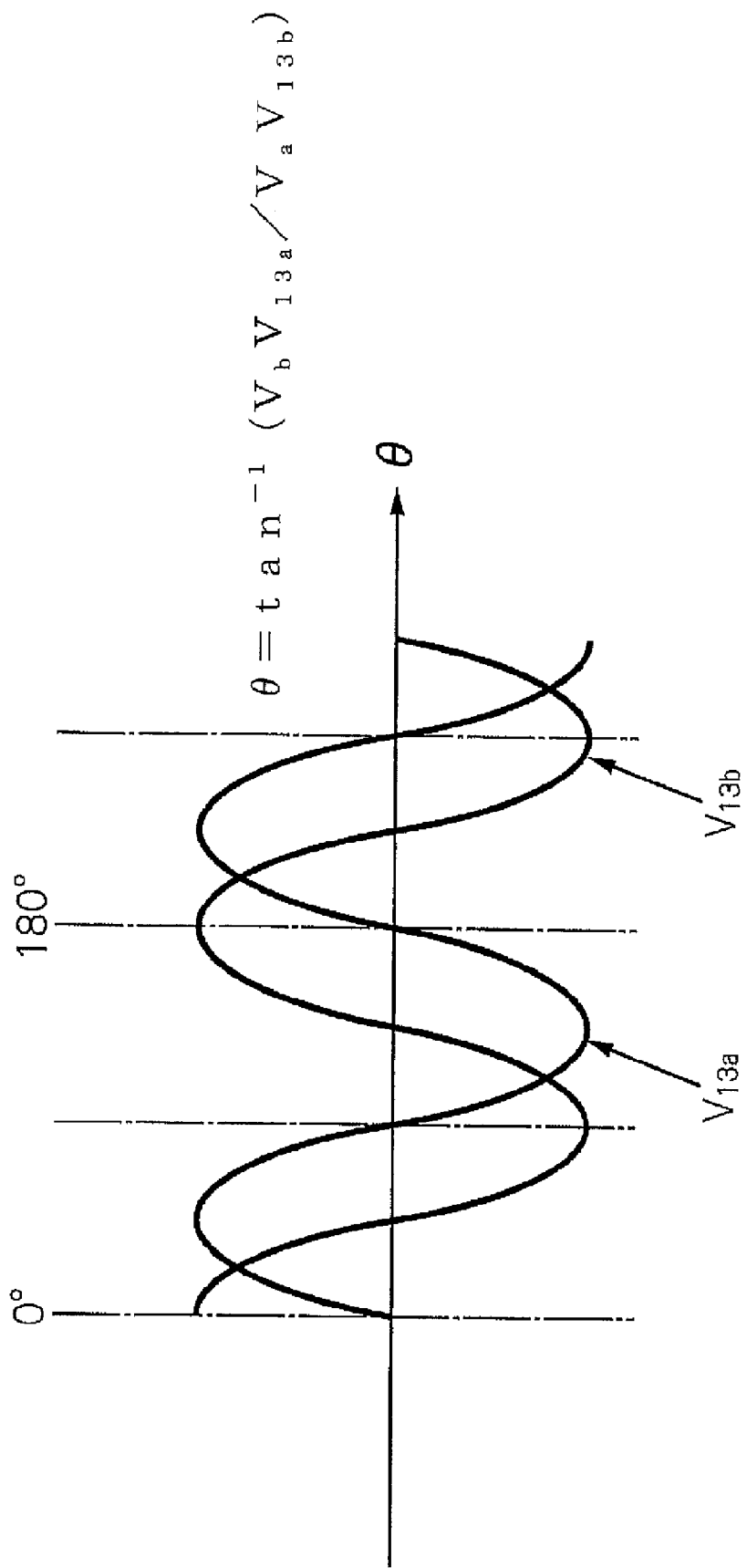
FIG. 2 shows the output signals of the hall elements 13a and 13b shown in FIG. 1.

FIG. 2 shows the outputs of the hall elements 13a and 13b in FIG. 1. As shown in the figure, when the rotator 11 is rotated with the ring magnet 12 by an angle of $\theta$, hall voltages $V_{13a}$ and $V_{13b}$, the signals output from the hall elements 13a and 13b, are expressed by the equation (3) and (4) described below. In this case, $V_a$ and $V_b$ are constant amplitude values of output signals of the hall elements 13a and 13b.

$$V_{13a} = V_a \times \sin\theta \quad (3)$$

$$V_{13b} = V_b \times \cos\theta \quad (4)$$

Accordingly, the rotation angle $\theta$ of the rotator 11 is expressed by the equation (7) described below.

$$\theta = \tan^{-1}(V_b V_{13a} / V_a V_{13b}) \quad (7)$$

As described above, the rotation sensor 10 detects the rotation angle $\theta$ of the rotator 11 based on the signal ratio of the output signals of the hall elements 13a and 13b. Accordingly, as far as the drive currents $I_a$ and $I_b$ of the hall elements 13a and 13b are equal values, even if the drive current I ($=I_a=I_b$) is changed by the disturbance, the rotation angle $\theta$ of the rotator 11 is accurately detected based on the signal ratio of the output signals of the hall elements 13a and 13b without being affected by the drive currents.

Then, the drive circuit which is provided in the rotation sensor 10 for outputting the hall voltages of the hall elements 13a and 13b, is explained.

Figure 3:
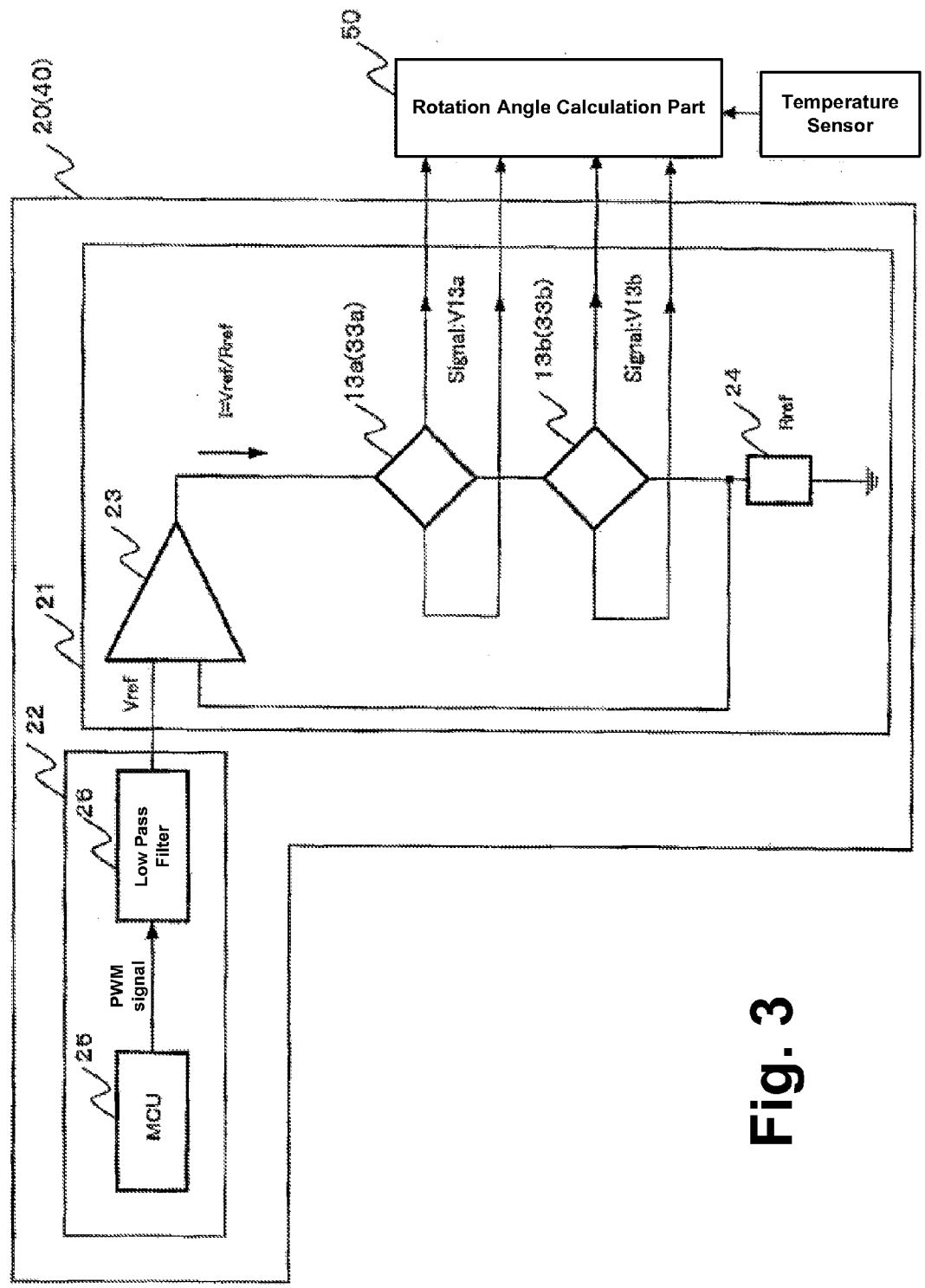
FIG. 3 shows one example of the drive circuit of the hall elements 13a and 13b.

FIG. 3 shows one example of the drive circuit of the hall elements 13a and 13b in FIG. 1. As shown in FIG. 3, the drive circuit 20 includes the hall element drive part 21 and the reference voltage adjustment part 22.

The hall element drive part 21 is for driving the hall elements 13a and 13b with constant current and includes the operational amplifier 23 and the reference resistance 24. And the hall elements 13a and 13b are serially connected. When the reference voltage Vref is input to the non-inverting input terminal of the operational amplifier 23, since the hall elements 13a and 13b are serially connected, the drive current I of the hall elements 13a and 13b is expressed by the equation (8) described below. In this case, the resistance value of the reference resistance 24 is denoted by Rref.

$$I = I_a = I_b = Vref/Rref \quad (8)$$

The reference voltage adjustment part 22 is for adjusting the reference voltage Vref input to the operational amplifier 23, and includes MCU (Micro Control Unit) 25 and low pass filter 26. PWM signal generated by the MCU 25 is rectified by the low pass filter (LPF) 26 for being generated as a signal of the reference voltage Vref and is input to the operational amplifier 23.

By adjusting the pulse width of the PWM signal generated by the MCU 25, the reference voltage Vref is changed.

Accordingly, by adjusting the reference voltage Vref, the drive current I of the hall elements 13a and 13b is changed, and the drive current I is adjusted so that the output signals of the hall elements 13a and 13b are optimized.

The rotation angle $\theta$ is calculated by the rotation angle calculation part 50 based on the output signals of the hall elements 13a and 13b output by the drive circuit 20 according to the equation (7) described above.

In the rotation sensor 10 described above, the hall elements 13a and 13b corresponds to the magnetic detection means of the present invention, the ring magnet 12 corresponds to the magnet of the present invention, the drive circuit 20 corresponds to the drive means of the present invention, the rotation angle calculation part 50 corresponds to the rotation angle calculation means, and the reference voltage adjustment part 22 corresponds to the signal adjustment means of the present invention.

As described above, since the drive circuit 20 in which hall elements 13a and 13b are serially connected is provided in the rotation sensor 10, constant drive current I can be applied to the hall elements 13a and 13b. Accordingly, effects of disturbance such as change of temperature, variation of electric source, or the like on the plural magnetic detection means can be the same, and the signal ratio of signals output from the plural magnetic detection means can be constant. Namely, the accident error of rotation angle detection caused by the disturbance such as change of temperature, variation of electric source, or the like, can be eliminated.

Furthermore, the same arbitrary signal gain (for example, reference voltage Vref) can be provided from outside. Namely, by adjusting signals output from the hall elements 13a and 13b into optimized signals, the accident error of detection can be eliminated.

Furthermore, as described above, in the reference voltage adjustment part 22, the reference voltage is adjusted with the analogue signal into which the digital signal is converted by adjusting the digital signal, however, analogue signal can be directly adjusted.

Figure 4:
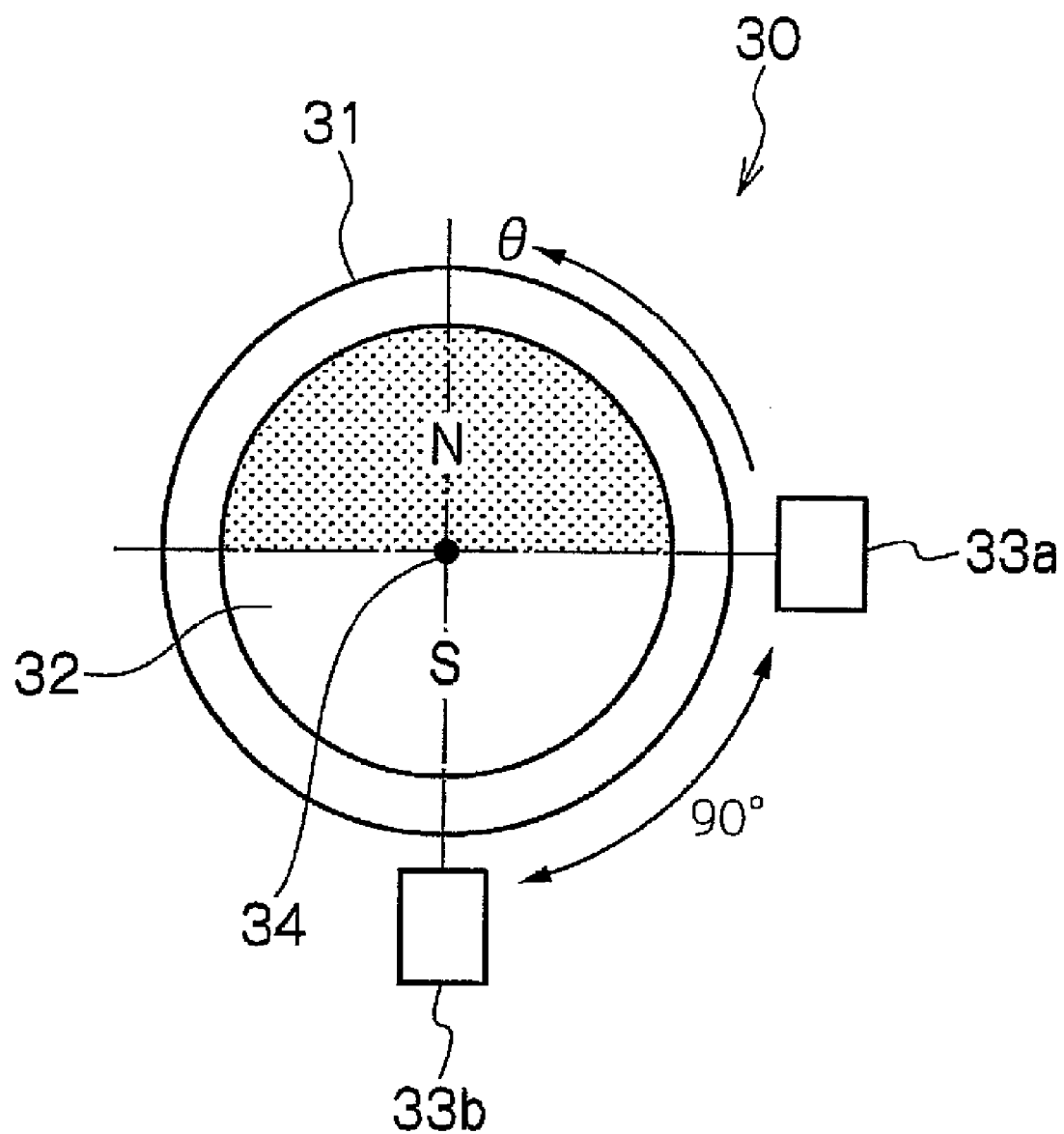
FIG. 4 shows one example of exterior configuration of another rotation sensor to which the present invention is applicable.
Figure 5:
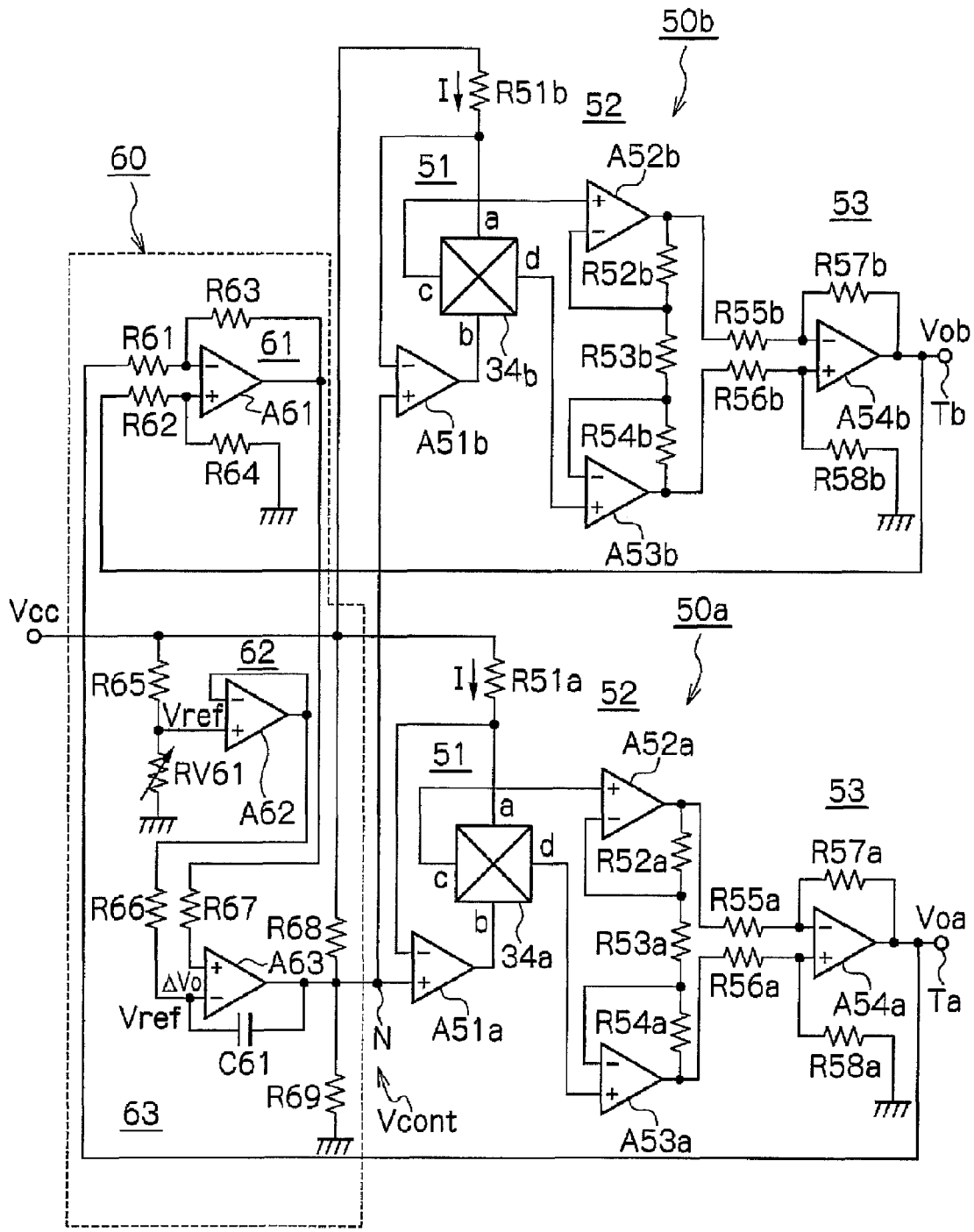
FIG. 5 shows the drive circuit of the hall elements provided in the conventional rotation angle sensor.
Figure 6:
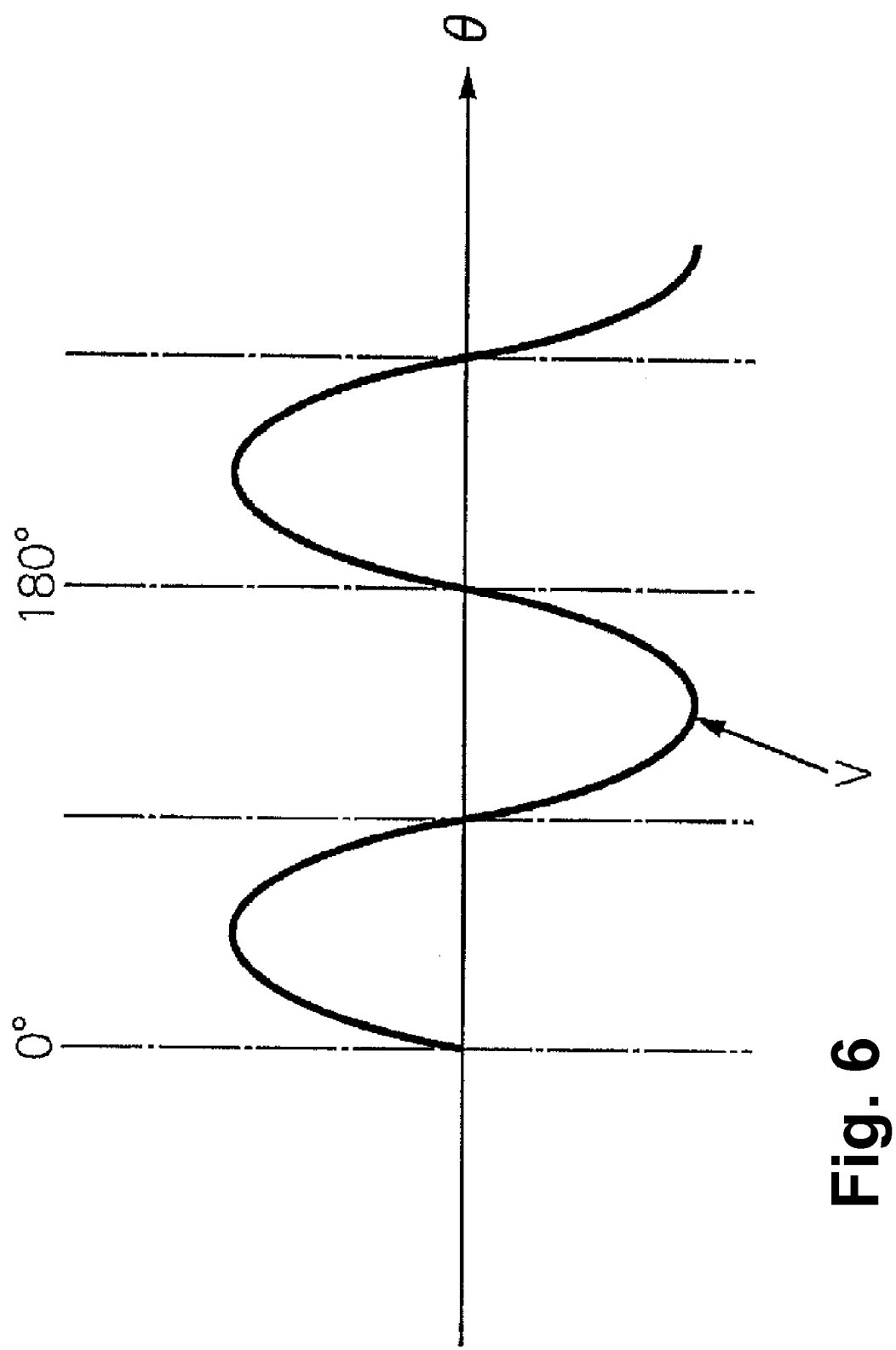
FIG. 6 shows one example of the output signal of the hall element.

FIG. 4 shows one example of the exterior configuration of another rotation sensor to which the present invention can be applied. As shown in FIG. 4, the rotation sensor 30 comprises disk magnet 32, hall element 33a, hall element 33b and drive circuit 40 (not depicted in the figure), for detecting the rotation angle of the rotator 31. The disk magnet 32 is magnetized in the circle direction and has a pair of North Pole and South Pole. And the disk magnet 32 is fixed to the rotator 31 and is rotated with the rotator 31. In this sensor, a shaft which is vertical to the magnetic sensitive surface of the disk magnet 32 is fixed in the center of the disk magnet 32 in the diameter direction, as a rotation center axis 34.

The hall elements 33a and 33b are arranged so that the change of intensity of magnetism in the vertical direction to the diameter direction of the disk magnet 32 can be detected. In this sensor, the hall elements 33a and 33b are arranged outside of the circle of the disk magnet 32 so that normal to the rotation center axis on the magnetic sensitive surface substantially is declined by an angle of 90°.

And, as similar to the drive circuit 20 in FIG. 3, in the drive circuit 40, the hall elements 33a and 33b are serially connected.

Even if it has a configuration described above, since the drive circuit 40 in which hall elements 33a and 33b are serially connected is provided in the rotation sensor 10, the same drive current I can be applied to the hall elements 33a and 33b. Accordingly, effects of disturbance such as change of temperature, variation of electric source, or the like, on the plural magnetic detection means can be similar, and the signal ratio of signals output from the plural magnetic detection means can be constant. Namely, the accident error in the detection of the rotation angle caused by the disturbance such as change of temperature, variation of electric source, or the like, can be eliminated.

Furthermore, the same arbitrary signal gain (for example, reference voltage Vref) can be provided from outside. Namely, by adjusting signals output from the hall elements 33a and 33b into optimized signals, the accident error of detection can be eliminated.

What is claimed is:

1. A rotation angle detector for detecting rotation angle of a rotator to be measured, comprising:
    a magnet which is fixed to said rotator to be measured and is rotated with said rotator to be measured;
    plural magnetic detection means respectively arranged at a prescribed angle, for detecting intensity of magnetic field generated by said magnet and outputting signals of electric charge based on said intensity of magnetic field;
    drive means for driving the plural magnetic detection means, capable of simultaneously changing magnetic sensitivities of said plural magnetic detection means in the same ratio; and
    rotation angle calculation means for calculating rotation angle of said rotator to be measured based on signals output from said plural magnetic detection means,
    wherein said drive means comprises signal adjustment means for adjusting signals output from said magnetic detection means into optimized signals which are within a prescribed range by changing drive currents.

2. The rotation angle detector as claimed in claim 1, wherein said plural magnetic detection means are serially connected and the drive currents of all of said plural magnetic detection means are maintained equal constant values.

3. The rotation angle detector as claimed in claim 2, wherein said drive means comprises signal adjustment means for adjusting signals output from said magnetic detection means into optimized signals which are within a prescribed range by changing said drive currents.

4. The rotation angle detector as claimed in claim 1, wherein said signal adjustment means changes all of said drive currents of said plural magnetic detection means into the same current values by changing one reference voltage for preset reference resistance.

5. The rotation angle detector as claimed in claim 3, wherein said signal adjustment means changes all of said drive currents of said plural magnetic detection means into the same current values by changing one reference voltage for preset reference resistance.

6. The rotation angle detector as claimed in claim 4, wherein said reference voltage is generated by rectifying pulse width modulation signal.

7. The rotation angle detector as claimed in claim 5, wherein said reference voltage is generated by rectifying pulse width modulation signal.

8. The rotation angle detector as claimed in claim 1, wherein said magnetic detection means consist of said hall elements, and said drive means consists of means to drive the hall elements with constant currents.

9. The rotation angle detector as claimed in claim 2, wherein said magnetic detection means consist of said hall elements, and said drive means consists of means to drive the hall elements with constant currents.

10. The rotation angle detector as claimed in claim 3, wherein said magnetic detection means consist of said hall elements, and said drive means consists of means to drive the hall elements with constant currents.

11. The rotation angle detector as claimed in claim 4, wherein said magnetic detection means consist of said hall elements, and said drive means consists of means to drive the hall elements with constant currents.

12. The rotation angle detector as claimed in claim 5, wherein said magnetic detection means consist of said hall elements, and said drive means consists of means to drive the hall elements with constant currents.

13. The rotation angle detector as claimed in claim 6, wherein said magnetic detection means consist of said hall elements, and said drive means consists of means to drive the hall elements with constant currents.

14. The rotation angle detector as claimed in claim 7, wherein said magnetic detection means consist of said hall elements, and said drive means consists of means to drive the hall elements with constant currents.

15. A method for a rotation angle detector for detecting a rotation angle of a rotator to be measured, comprising:
    rotating a magnet fixed to the rotator to be measured, wherein the magnet is rotated with the rotator to be measured;
    detecting, with plural magnetic detection units respectively arranged at a prescribed angle, an intensity of a magnetic field generated by said magnet;
    outputting, with the plural magnetic detection units, signals of electric charge based on said intensity of the magnetic field;

driving the plural magnetic detection units with a drive unit capable of simultaneously changing magnetic sensitivities of said plural magnetic detection units in a same ratio; and calculating, with a rotation angle calculation unit, the rotation angle of said rotator to be measured based on the signals output from the plural magnetic detection units, wherein said drive unit comprises a signal adjustment unit for adjusting signals output from said magnetic detection unit into optimized signals which are within a prescribed range by changing drive currents.

* * * * *